United States Patent
Flores et al.

(10) Patent No.: US 12,110,366 B2
(45) Date of Patent: Oct. 8, 2024

(54) SEMI-AROMATIC, SEMI-CRYSTALLINE POLYAMIDE POLYMERS AND CORRESPONDING POLYMER COMPOSITIONS AND ARTICLES

(71) Applicant: SOLVAY SPECIALTY POLYMERS USA, LLC, Alpharetta, GA (US)

(72) Inventors: Joel W. Flores, Alpharetta, GA (US); Stéphane Jeol, Saint-Genis-Laval (FR)

(73) Assignee: SOLVAY SPECIALTY POLYMERS USA, LLC, Alpharetta, GA (US)

(*) Notice: Subject to any disclaimer, the term of this patent is extended or adjusted under 35 U.S.C. 154(b) by 484 days.

(21) Appl. No.: 17/424,988

(22) PCT Filed: Jan. 21, 2020

(86) PCT No.: PCT/EP2020/051444
§ 371 (c)(1),
(2) Date: Jul. 22, 2021

(87) PCT Pub. No.: WO2020/152185
PCT Pub. Date: Jul. 30, 2020

(65) Prior Publication Data
US 2022/0127420 A1 Apr. 28, 2022

Related U.S. Application Data

(60) Provisional application No. 62/795,324, filed on Jan. 22, 2019.

(30) Foreign Application Priority Data

Feb. 18, 2019 (EP) ..................... 19157834

(51) Int. Cl.
*C08G 69/26* (2006.01)
*C08K 3/32* (2006.01)
(52) U.S. Cl.
CPC .............. *C08G 69/265* (2013.01); *C08K 3/32* (2013.01); *C08K 2003/329* (2013.01)
(58) Field of Classification Search
CPC ................. C08G 69/26; C08K 3/32
USPC ........................................................ 524/706
See application file for complete search history.

(56) References Cited

U.S. PATENT DOCUMENTS

| | | |
|---|---|---|
| 3,875,120 A | 4/1975 | Brinkmann et al. |
| 3,875,129 A | 4/1975 | Herwig et al. |
| 4,246,395 A | 1/1981 | Mortimer |
| 9,080,029 B2 | 7/2015 | Rulkens et al. |
| 2013/0165621 A1 | 6/2013 | Kanda et al. |
| 2017/0107326 A1 | 4/2017 | Bayer et al. |
| 2017/0368762 A1 | 12/2017 | Gautam et al. |
| 2020/0017636 A1 | 1/2020 | Capelot et al. |
| 2020/0216627 A1 | 7/2020 | Hochstetter et al. |

FOREIGN PATENT DOCUMENTS

| | | | |
|---|---|---|---|
| CN | 103387667 A | 11/2013 | |
| EP | 0325030 A2 | 7/1989 | |
| EP | 2305735 A1 | 4/2011 | |
| EP | 2727951 A1 | 5/2014 | |
| EP | 3378883 A1 | 9/2018 | |
| JP | 63154739 A | 6/1988 | |
| JP | 7165911 A | 6/1995 | |
| JP | 2010285553 A | 12/2010 | |
| JP | 2011111576 A | 6/2011 | |
| JP | 2012102232 A | 5/2021 | |
| WO | 16058991 A1 | 4/2016 | |
| WO | WO-2018172718 A1 * | 9/2018 | ......... B29C 45/0005 |
| WO | 18229114 A1 | 12/2018 | |
| WO | 18234441 A1 | 12/2018 | |

OTHER PUBLICATIONS

Murphy J., in "Additives for Plastics Handbook", 2nd Edition, 2001, Chapter 5.2.3., p. 43-48—Elsevier Advanced Technology.
Wallenberger, F. T; Bingham, P. A. (Eds.)., "Fiberglass and Glass Technology", 2010, XIV, chapter 5, p. 197-225, Springer.

* cited by examiner

Primary Examiner — Deve V Hall
(74) Attorney, Agent, or Firm — Osha Bergman Watanabe & Burton LLP

(57) ABSTRACT

Described herein are polyamide polymers having improved glass transition temperatures ("Tg") and relatively small values of Tm−Tg, where Tm is the melting temperature of the polyamide polymer. The polyamide polymers are semi-aromatic, semi-crystalline polyamide polymers that include recurring units formed the polycondensation of (1) a linear aliphatic diamine and a cycloaliphatic diamine with (2) an aromatic dicarboxylic acid. Due at least in part to the improved Tg, the polyamide polymers can be desirably incorporated into application settings including, but not limited to, mobile electronic devices, automotive, aerospace, building and construction, oil and gas, industrial, electrical and electronics, consumer goods, medical and healthcare. Furthermore, the polyamide polymers have relatively small values of Tm−Tg and, therefore, articles including the polyamide polymers can be more efficiently produced due to relatively small cycle times.

11 Claims, No Drawings

SEMI-AROMATIC, SEMI-CRYSTALLINE POLYAMIDE POLYMERS AND CORRESPONDING POLYMER COMPOSITIONS AND ARTICLES

CROSS REFERENCE TO RELATED APPLICATIONS

This application is a U.S. national stage entry under 35 U.S.C. § 371 of international patent application No. PCT/EP2020/051444 filed on Jan. 21, 2020, which claims priority to U.S. provisional patent application No. 62/795,324, filed on Jan. 22, 2019, and to European patent application No. 19157834.3, filed on Feb. 18, 2019, the whole content of each of these applications being explicitly incorporated herein by reference.

FIELD OF THE INVENTION

The invention relates to semi-aromatic, semi-crystalline polyamide polymers having improved glass transition temperatures. The invention also relates to polyamide polymer compositions and articles including the semi-crystalline polyamide polymers.

BACKGROUND OF THE INVENTION

Semi-aromatic, semi-crystalline polyamide polymers are ideal for a broad range of application settings. Due at least in part to their chemical resistance, high mechanical performance and dimensional stability, semi-aromatic, semi-crystalline polyamide polymers are ubiquitous in at least mobile device and automotive applications. Nevertheless, due to the relatively low glass transition temperature ("Tg") of many semi-aromatic, semi-crystalline polyamide polymers, extending their use to higher heat application settings is challenging, especially in application where the semi-aromatic, semi-crystalline polyamide is required to maintain a high modulus up to a high temperature, for example, at or at or above 150° C. Additionally, semi-aromatic, semi-crystalline polyamide polymers that are partially or completely bio-based and meet the aforementioned mechanical requirements at high temperature are even more desirable, as they provide an environmentally friendly solution. Still further, semi-aromatic, semi-crystalline polyamide polymers that have relatively high solidification rates are desirably because they allow for articles formed the polyamide polymers to be produced (e.g. by injection molding) quickly, relative to polyamide polymers having lower solidification rates.

SUMMARY OF INVENTION

In a first aspect, the invention relates to a polymer including recurring units $R_{P41}$ and $R_{P42}$, where recurring unit $R_{P41}$ is represented by the following formula:

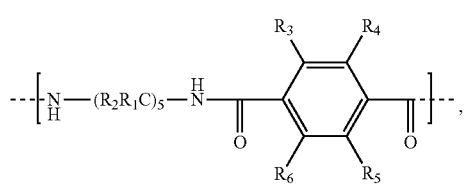
(1)

where $R_1$ and $R_2$, at each location, is independently selected from the group consisting of a hydrogen, a halogen, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $R_3$ to $R_6$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. Recurring unit $R_{P42}$ is represented by a formula selected from the following group of formulae:

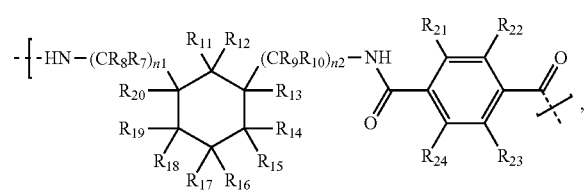
(3)

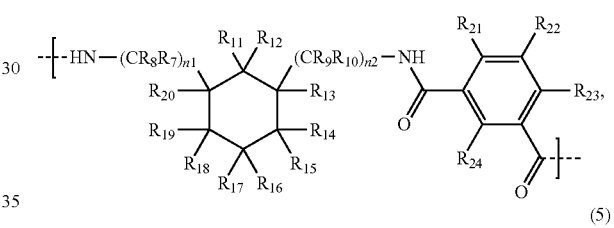
(4)

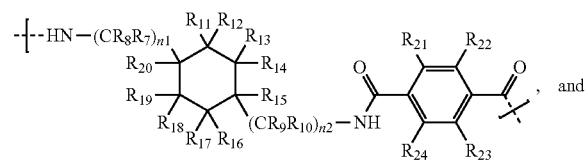
(5)
, and

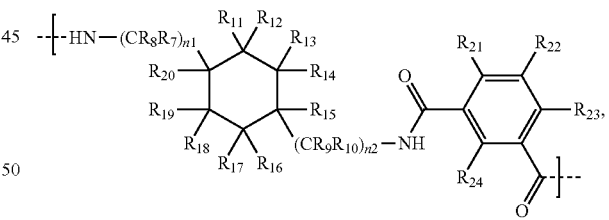
(6)

where $R_7$ to $R_{10}$, at each location, and $R_{11}$ to $R_{24}$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $n_1$ and $n_2$ are independently selected integers from 1 to 10, preferably from 1 to 2, most preferably $n_1$ and $n_2$ are both 1.

In some embodiments, recurring unit $R_{P41}$ is represented by Formula (1) and $R_{P42}$ is represented by Formula (3). In alternative embodiments, recurring unit $R_{P41}$ is represented by Formula (1) and $R_{P42}$ is represented by Formula (5). In some embodiments, $R_1$, $R_2$ and $R_7$ to $R_{10}$, at each location, is a hydrogen and $R_3$ to $R_6$ and $R_{11}$ to $R_{24}$ are all hydrogen. In some embodiments, the polyamide polymer is either PA 5,T/1,3-BAC,T or PA 5,T/1,4-BAC,T. In some embodiments, the polyamide polymer comprises, in total, at least 90 mol % of recurring unit $R_{P41}$ and $R_{P42}$. In some embodiments, the ratio of the number of moles of recurring unit $R_{P41}$ to $R_{P42}$ is at least 1.

In some embodiments, the polyamide polymer further includes a recurring unit $R_{P43}$ and a recurring unit $R_{P44}$, where recurring unit $R_{P43}$ is distinct from recurring unit $R_{P41}$ and represented by Formula (1) or the following formula:

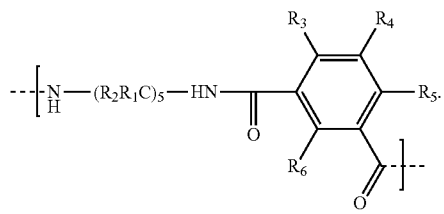

Recurring unit $R_{P44}$ is distinct from recurring unit $R_{P42}$ and is represented by a formula selected from Formulae (3) to (6). In some embodiments, the polyamide polymer is either PA 5,T/5,I/1,3-BAC,T/1,3-BAC,I or PA 5,T/5,I/1,4-BAC,T/1,4-BAC,I. In some embodiments, the polyamide polymer comprises, in total, at least 90 mol % of recurring units $R_{P41}$ to $R_{P44}$.

In some embodiments, the polyamide polymer has a glass transition temperature ("Tg") of at least 150° C. Additionally or alternatively, in some embodiments, the difference between the melting temperature ("Tm") of the polyamide polymer and the Tg of the polyamide polymer (Tm–Tg) is no more than 170° C.

In another aspect, the invention relates to a polyamide polymer composition including the polyamide polymer; a reinforcing fiber; optionally, an additive selected from the group consisting of ultra-violet ("UV") stabilizers, heat stabilizers, pigments, dyes, flame retardants, impact modifiers, processing aids, nucleating agents, mineral fillers, and any combination of one or more thereof, and, optionally, an additional polymer selected from the group consisting of a distinct polyamide polymer, a polyester polymer, a polyaryl ether sulfone polymer, a polyaryl ether ketone polymer, a polyarylene sulfide polymer, a polyaryl ether polymer, a liquid crystal polymers, and any combination of one or more thereof.

In yet another aspect, the invention relates to an article including the polyamide polymer of the polyamide polymer composition, where the article is either a mobile electronic device component or an automotive component selected from the group consisting of connectors, tubings, housing, pans, switches, sockets, caps, rings, flanges, impellers, brackets, valves, covers, structural supports, washers and any combination of one or more thereof.

In still yet another aspect, the invention relates to a method for making the polyamide polymer of any one of claims 1 to 11, the method comprising polycondensing (1) a linear aliphatic diamine and a cycloaliphatic diamine with (2) an aromatic dicarboxylic acid, where the linear aliphatic diamine is represented by the following formula:

$$H_2N-(R_2R_1C)_5-NH_2 \quad (7).$$

The cycloaliphatic diamine is represented by a formula selected from the following group of formulae:

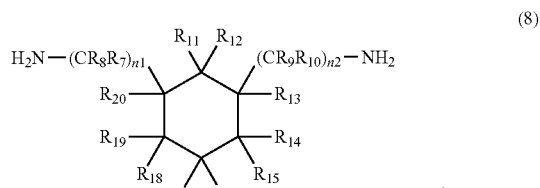

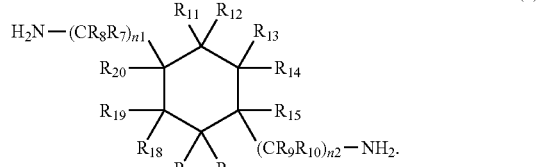

The aromatic dicarboxylic acid is represented by the following formula:

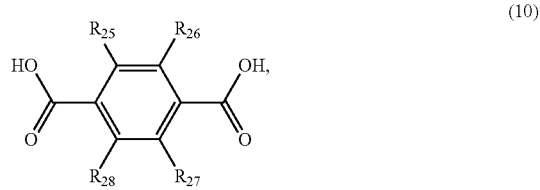

where $R_{25}$ to $R_{28}$ are independently selected from the group consisting of a hydrogen, a hydroxyl, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

DETAILED DESCRIPTION OF THE INVENTION

Described herein are polyamide polymers having improved glass transition temperatures ("Tg") and relatively small values of Tm–Tg, where Tm is the melting temperature of the polyamide polymer. The polyamide polymers are semi-aromatic, semi-crystalline polyamide polymers that include recurring units formed the polycondensation of (1) a linear aliphatic diamine and a cycloaliphatic diamine with (2) an aromatic dicarboxylic acid. Due at least in part to the improved Tg, the polyamide polymers can be desirably incorporated into application settings including, but not limited to, mobile electronic devices, automotive, aerospace, building and construction, oil and gas, industrial, electrical and electronics, consumer goods, medical and healthcare. Furthermore, the polyamide polymers have relatively small values of Tm–Tg and, therefore, articles including the polyamide polymers can be more efficiently produced due to relatively small cycle times.

The polyamide polymers described herein have a relative high Tg and melting temperature ("Tm"). The increased Tg allows for a greater range of applications, especially for high heat applications. For example, where the Tg is close to the use temperature in the selected application setting, the polyamide polymer has, in general, lower stiffness and dimensional stability, relative to corresponding polyamide polymer compositions having a Tg well above the use temperature. In some embodiments, the polyamide polymer has a Tg of at least 150° C. Additionally or alternatively, in some embodiments the polyamide polymer has a Tg of no more than 200° C., no more than 190° C. no more than 180° C., no more than 170° C., or no more than 165° C. In some embodiments, the polyamide polymer has a Tg of from 150° C. to 200° C., from 150° C. to 190° C., from 150° C. to 180° C., from 150° C. to 170° C., or from 150° C. to 165° C. In some embodiments, the polyamide polymer has a Tm of at least 250° C., at least 260° C., 270° C., or at least 280° C. Additionally or alternatively, the polyamide polymer has a Tm of no more than 350° C., no more than 340° C., no more than 330° C., or no more than 320° C. In some embodiments, the polyamide polymer has a Tm of from 250° C. to 350° C., from 260° C. to 340° C., from 270° C. to 330° C., or from 280° C. to 320° C.

Additionally, the polyamide polymers have a relatively small value of Tm−Tg. The reduced difference between Tm and Tg translate into shorter cycle times during polymer molding, at least in part due to the reduced solidification time relative polyamide polymers having a greater Tm−Tg. In some embodiments, the polyamide polymers have a value of Tm−Tg of no more than 100° C., at least 115° C., or at least 120° C. Additionally or alternatively, in some embodiments, the polyamide polymers has a Tm−Tg of no more than 170° C., no more than 160° C. or no more than 155° C. In some embodiments, the polyamide polymer has a Tm−Tg of from 100° C. to 170° C., from 100° C. to 160° C., from 115° C. to 160° C., from 115° C. to 155° C., or from 120° C. to 155° C.

The Polyamide Polymer

The polyamide polymer includes, in total, at least 50 mole percent ("mol %") of a recurring unit $R_{P41}$ and a recurring unit $R_{P42}$. As used herein mol % is relative to the total number of moles of recurring units in the polyamide polymer, unless explicitly noted otherwise. In some embodiments, the polyamide polymer includes, in total, at least 60 mol %, at least 70 mol %, at least 80 mol %, at least 90 mol %, at least 95 mol %, at least 99 mol %, or at least 99.9 mol % of recurring units $R_{P41}$ and $R_{P42}$.

Recurring unit $R_{P41}$ is represented by the following formula:

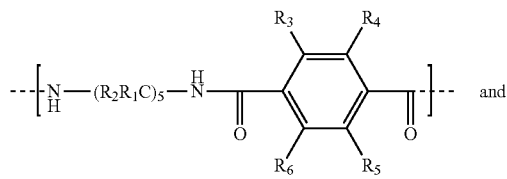

(1)

where $R_1$ and $R_2$, at each location, is independently selected from the group consisting of a hydrogen, a halogen, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $R_3$ to $R_6$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. In some embodiments, $R_1$ and $R_2$ at each location are hydrogen, $R_5$ to $R_6$ are all hydrogen, or both. For clarity, as used herein, a dashed bond ("---") represents a bond to an atom outside the drawn structure, for example, a bond to an atom in an adjacent recurring unit. Furthermore, the person of ordinary skill in the art will understand that in the notation $—(R_aR_bC)_n—$, the n carbons are bonded in a chain and each carbon has an independently selected $R_a$ and $R_b$ substituent.

Recurring unit $R_{P42}$ is represented by a formula selected from the following group of formulae:

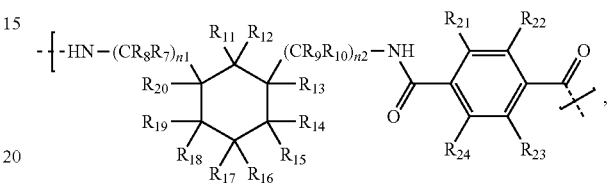

(3)

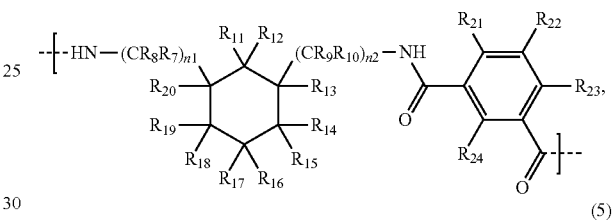

(4)

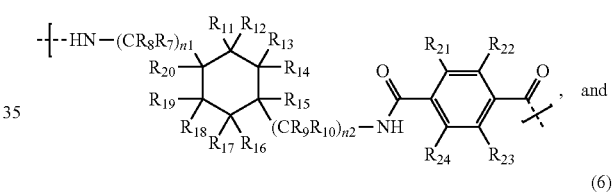

(5)

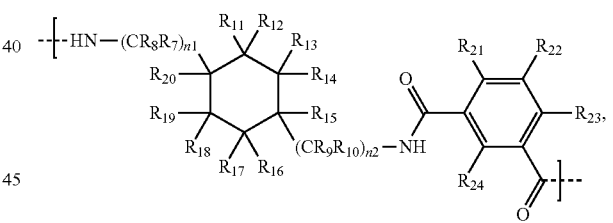

(6)

where $R_7$ to $R_{10}$, at each location, and $R_{11}$ to $R_{24}$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $n_1$ and $n_2$ are independently selected integers from 1 to 10. In some embodiments, either $n_1=n_2$, $n_1$ and $n_2$ are independently selected integers from 1 to 2, or both. Preferably, $n_1$ and $n_2$ are both 1. In some embodiments, $R_3$ to $R_6$ are the same as $R_{21}$ to $R_{24}$, respectively. In some embodiments, $R_1$ to $R_8$ are all hydrogen, $R_9$ to $R_{12}$ are all hydrogen, or both.

In some embodiments, the polyamide polymer is either PA 5,T/1,3-BAC,T or PA 5,T/1,4-BAC,T, where BAC refers to bis(aminomethyl)cyclohexane.

In some embodiments, the ratio of the number of moles of recurring unit $R_{P41}$ to $R_{P42}$ (moles $R_{P41}$/moles $R_{P42}$) is at least 1. Additionally or alternatively, in some embodiments the ratio of the number of moles of recurring unit $R_{PA1}$ to $R_{PA2}$ is no more than 2.3 or no more than 1.5. In some embodiments, the ratio of the number of moles of recurring unit $R_{PA1}$ to $R_{PA2}$, is from 1 to 2.3 or from 1 to 1.5.

In some embodiments, the polyamide polymer has recurring units in addition to recurring unit $R_{PA1}$ and recurring unit $R_{PA2}$. In some such embodiments, the polyamide polymer additionally has a recurring unit $R_{PA3}$ and a recurring unit $R_{PA4}$ each distinct from each other and distinct from recurring unit $R_{PA1}$ and recurring unit $R_{PA2}$. In some such embodiments, recurring unit $R_{PA3}$ is represented by Formula (1) or the following formula:

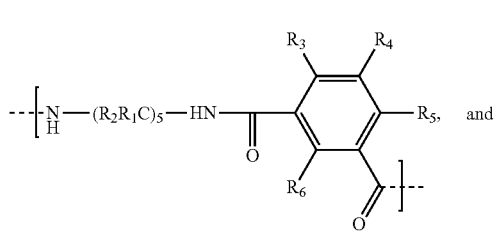

(2)

and recurring unit $R_{PA4}$ is represented by formulae selected from the group consisting of Formulae (3) to (6). In some such embodiments, the polyamide polymer is either PA 5,T/5,I/1,3-BAC,T/1,3-BAC,I or PA 5,T/5,I/1,4-BAC,T/1,4-BAC,I. In some embodiments in which the polyamide polymer includes recurring unit $R_{PA3}$ and a recurring unit $R_{PA4}$, the total concentration of recurring units $R_{PA1}$ to $R_{PA4}$ is within the ranges described above with respect to the total concentration of recurring units $R_{PA1}$ and $R_{PA2}$.

In some embodiments, the polyamide polymer has an inherent viscosity of at least 0.3 deciliters per gram ("dL/g"), at least 0.4 dL/g, or at least 0.5 dL/g. In some embodiments, the polyamide polymer has an inherent viscosity of no more than 1.6 dL/g. In some embodiments, the polyamide polymer has an inherent viscosity of from 0.3 dL/g to 1.6 dL/g, from 0.4 dL/g to 1.6 dL/g, or from 0.5 dL/g to 1.6 dL/g. Inherent viscosity can be measured by solution viscosity using phenol-tetrachloroethane ("PTCE") as solvent following ASTM D5255 standard method.

Synthesis of the Polyamide Polymer

The polyamide polymer can be synthesized by methods well known in the art. In one approach, the polyamide polymers are synthesized by polycondensation of (1) a linear aliphatic diamine and a cycloaliphatic diamine with (2) an aromatic dicarboxylic acid.

The linear aliphatic diamine represented by the following formula:

$$H_2N-(R_2R_1C)_5-NH_2 \quad (7).$$

The cycloaliphatic diamine represented by a formula selected from the following group of formulae:

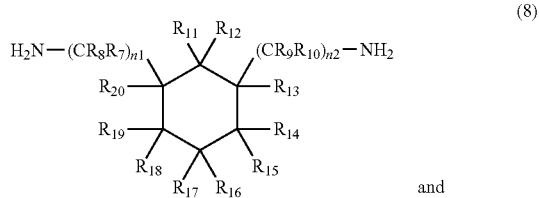

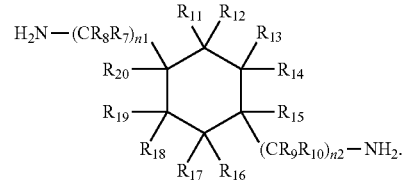

The aromatic dicarboxylic acid is represented by the following formula:

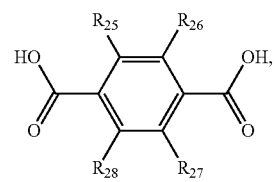

where $R_{25}$ to $R_{28}$ are independently selected from the group consisting of a hydrogen, a hydroxyl, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. For clarity, in some embodiments, the polyamide polymer can be synthesized using either more than two diamines, more than one dicarboxylic acid, or more than two diamines and more than one dicarboxylic acid. In some such embodiments in which the polyamide polymer is synthesized using more than two diamines, each of the additional diamines is independently represented by Formula (8) or Formula (9). Additionally or alternatively, in some embodiments in which the polyamide polymer is synthesized using more than one dicarboxylic acid, each of the additional carboxylic acids is independently represented by Formula (10) or the following formula

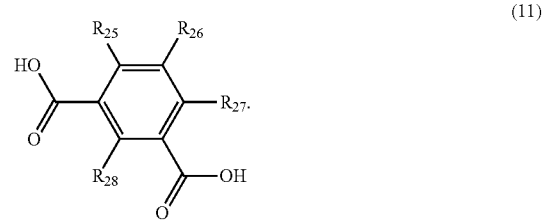

Based upon the description herein, the person of ordinary skill in the art will know how to select the appropriate diamines and dicarboxylic acids to form the recurring units of the polyamide polymer (e.g. recurring units $R_{PA1}$ and $R_{PA2}$ and optional additional recurring units $R_{PA3}$ and $R_{PA4}$). For example, a recurring unit according to Formula (1) can be formed by the polycondensation of a diamine according to Formula (7) with a dicarboxylic acid according to Formula (10), where $R_{25}$ to $R_{28}$ are the same as $R_3$ to $R_6$, respectively. As another example, a recurring unit according to Formula (3) can be formed by the polycondensation of a diamine according to Formula (8) with a dicarboxylic acid according to Formula (10), where $R_{25}$ to $R_{28}$ are the same as $R_{21}$ to $R_{24}$, respectively. As yet another example, the polyamide polymer PA 5,T/1,3-BAC,T can be formed from the polycondensation of a diamine according to Formula (7) and a diamine according to Formula (8) with a dicarboxylic acid according to Formula (10), where $R_1$ and $R_2$, at each instance, and $R_{21}$ to $R_{28}$ are all hydrogens. Still, as yet another example, the polyamide polymer PA 5,T/5,I/1,4-BAC,T/1,4-BAC,I can be formed from the polycondensation of a diamine according to Formula (7) and a diamine according to Formula (9) with a dicarboxylic acid according to Formula (10) and a dicarboxylic acid according to Formula (11), where $R_1$ and $R_2$, at each instance, and $R_{11}$ to $R_{28}$ are all hydrogens.

Polyamide Polymer Compositions

The polyamide polymer can be desirably incorporated into polyamide polymer compositions. In some such embodiments, the concentration of the polyamide polymer in the polyamide polymer composition is at least 10 weight percent ("wt. %"), at least 20 wt %, at least 30 wt. % or at least 35 wt. %. Additionally or alternatively, in some embodiments, the concentration of the polyamide polymer in the polyamide polymer composition is no more than 99.9 wt. %, no more than 80 wt. %, no more than 60 wt. % or no more than 55 wt. %. In some embodiments, the concentration of the polyamide polymer in the polyamide polymer composition is from 10 wt. % to 99.9 wt. %, from 20 wt. % to 80 wt. %, from 30 wt. % to 60 wt. % or from 35 wt. % to 55 wt. %. As used herein, weight percent is relative to the total weight of the polyamide polymer composition, unless explicitly noted otherwise.

The polyamide polymer composition can include, in addition to the polyamide polymer, reinforcing fibers and additives selected from the group consisting of ultra-violet ("UV") stabilizers, heat stabilizers, pigments, dyes, flame retardants, impact modifiers, processing aids, nucleating agents, mineral fillers, and any combination of one or more thereof. Additionally or alternatively, in some embodiments, the polyamide polymer composition includes an additional polymer. Examples of desirably additional polymers include, but are not limited to, a distinct polyamide polymer (aliphatic or semi-aromatic), a polyester polymer, a polyaryl ether sulfone polymer, a polyaryl ether ketone polymer, a polyarylene sulfide polymer, a polyaryl ether polymer, a liquid crystal polymers, and any combination of one or more thereof.

Reinforcing fibers include, but are not limited to, glass fibers, carbon fibers, asbestos, synthetic polymeric fibers (e.g. aramid fibers), aluminum fibers, aluminum silicate fibers, oxide of metals of such aluminum fibers, titanium fibers, magnesium fibers, rock wool fibers, steel fibers, silicon carbide fibers, and boron fibers. Preferably, the reinforcing fiber is carbon fiber or glass fiber and, most preferably, glass fiber.

With respect to carbon fibers, while the morphology of the carbon fiber is not particularly limited, in some embodiments, the carbon fibers have an average length of 4 mm to 10 mm. Additionally or alternatively, in some embodiments, the carbon fibers have an average aspect ratio (longest length/longest diameter) of 20 to 40, where the diameter is perpendicular to the length. In some embodiments, the carbon fiber can have a tow of 12,000 to 50,000.

In some embodiments, the polyamide polymer composition includes at least 5 weight percent ("wt. %"), at least 10 wt. %, at least 15 wt. % or at least 20 wt. % of the carbon fiber. Additionally or alternatively, in some embodiments, the polyamide polymer composition includes no more than 60 wt. %, no more than 50 wt. %, no more than 45 wt. %, or no more than 40 wt % of the carbon fiber. In some embodiments, the polyamide polymer compositions includes from 5 wt. % to 60 wt. %, from 10 wt. % to 50 wt. %, from 15 wt. % to 45 wt. % or from 20 wt. % to 40 wt. % of the carbon fiber. As used herein, wt. % is relative to the total weight of the polyamide polymer composition unless explicitly noted otherwise.

In some embodiments, the polyamide polymer composition includes glass fiber. Glass fibers are silica-based glass compounds that contain several metal oxides which can be tailored to create different types of glass. The main oxide is silica in the form of silica sand; the other oxides such as calcium, sodium and aluminum are incorporated to reduce the melting temperature and impede crystallization. The glass fibers can be added as endless fibers or as chopped glass fibers. The glass fibers have generally an equivalent diameter of 5 to 20 preferably of 5 to 15 μm and more preferably of 5 to 10 μm. All glass fiber types, such as A, C, D, E, M, S, R, T glass fibers (as described in chapter 5.2.3, pages 43-48 of Additives for Plastics Handbook, 2nd ed, John Murphy), or any mixtures thereof or mixtures thereof may be used.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. On the other hand, R, S and T glass fibers comprise less than 10 wt. % of CaO.

In some embodiments, the glass fiber is a high modulus glass fiber. High modulus glass fibers have an elastic modulus of at least 76, preferably at least 78, more preferably at least 80, and most preferably at least 82 GPa as measured according to ASTM D2343. Examples of high modulus glass fibers include, but are not limited to, S, R, and T glass fibers. A commercially available source of high modulus glass fibers is S-1 and S-2 glass fibers from Taishan and AGY, respectively.

The morphology of the glass fiber is not particularly limited. As noted above, the glass fiber can it can have a circular cross-section ("round glass fiber") or a non-circular cross-section ("flat glass fiber"). Examples of suitable flat glass fibers include, but are not limited to, glass fibers having oval, elliptical and rectangular cross sections. In some embodiments in which the polymer composition includes a flat glass fiber, the flat glass fiber has a cross-sectional longest diameter of at least 15 μm, preferably at least 20 μm, more preferably at least 22 μm, still more preferably at least 25 μm. Additionally or alternatively, in some embodiments, the flat glass fiber has a cross-sectional longest diameter of at most 40 μm, preferably at most 35 μm, more preferably at most 32 μm, still more preferably at most 30 μm. In some embodiments, the flat glass fiber has a cross-sectional diameter was in the range of 15 to 35 μm, preferably of 20 to 30 μm and more preferably of 25 to 29 μm. In some embodiments, the flat glass fiber has a cross-sectional shortest diameter of at least 4 μm, preferably at least 5 μm, more preferably at least 6 μm, still more preferably at least 7 μm. Additionally or alternatively, in some embodiments, the flat glass fiber has a cross-sectional shortest diameter of at most 25 μm, preferably at most 20 μm, more preferably at most 17 μm, still more preferably at most 15 μm. In some embodiments, the flat glass fiber has a cross-sectional shortest diameter of from m to 20 μm, preferably from 5 μm to 15 μm and more preferably from 7 μm to 11 μm.

In some embodiments, the flat glass fiber has an aspect ratio of at least 2, preferably at least 2.2, more preferably at least 2.4, still more preferably at least 3. The aspect ratio is defined as a ratio of the longest diameter in the cross-section of the glass fiber to the shortest diameter in the same cross-section. Additionally or alternatively, in some embodiments, the flat glass fiber has an aspect ratio of at most 8, preferably at most 6, more preferably of at most 4. In some embodiments, the flat glass fiber has an aspect ratio of from 2 to 6, and preferably, from 2.2 to 4. In some embodiments, in which the glass fiber is a round glass fiber, the glass fiber has an aspect ratio of less than 2, preferably less than 1.5, more preferably less than 1.2, even more preferably less than 1.1, most preferably, less than 1.05. Of course, the person of ordinary skill in the art will understand that regardless of the morphology of the glass fiber (e.g. round or flat), the aspect ratio cannot, by definition, be less than 1.

In some embodiments, the polyamide polymer composition has at least 5 wt. %, at least 20 wt. %, at least 25 wt. % or at least 30 wt. % of the glass fiber. Additional or alternatively, in some embodiments, the polyamide polymer composition has no more than 50 wt. %. In some embodiments, the polyamide polymer composition has from 5 wt. % to 50 wt. %, from 20 wt. % to 50 wt. %, from 25 wt. % to 50 wt. % or from 30 wt. % to 50 wt. % of the glass fiber.

With respect to additives and additional polymers, in some embodiments the total concentration of additives and additional polymers is at least 0.5 wt. % or at least 1 wt. %. Additionally or alternatively, in some embodiments, the total concentration of the additives and additional polymers is no more than 30 wt %, no more than 25 wt %, no more than 20 wt. %, no more than 15 wt. %, no more than 10 wt. %, no more than 5 wt. %, no more 4 wt. % or no more than 3 wt. %. In some embodiments, the total concentration of the additives is from 0.5 wt. % to 30 wt. %, from 0.5 wt. % to 25 wt. %, from 0.5 wt. % to 20 wt. %, from 0.5 wt. % to 15 wt. %, from 0.5 wt. % to 10 wt. %, from 0.5 wt. % to 5 wt. %, from 1 wt. % to 5 wt. %, from 1 wt. % to 4 wt. % or from 1 wt. % to 3 wt. %.

Formation of Polyamide Polymer Compositions

The polyamide polymer compositions can be made using methods well known in the art. For example, in one embodiment, the polyamide polymer composition can be made by melt-blending the polymer and any reinforcing fibers or additives. Any suitable melt-blending method may be used for combining the components of the polyamide polymer composition. For example, in one embodiment, all of the polyamide polymer composition components (e.g. the polyamide polymer and any reinforcing fibers and additives) are fed into a melt mixer, such as single screw extruder or twin screw extruder, agitator, single screw or twin screw kneader, or Banbury mixer. The components can be added to the melt mixer all at once or gradually in batches. When the components are gradually added in batches, a part of the components is first added, and then is melt-mixed with the remaining components are subsequently added, until an adequately mixed composition is obtained. Where the polyamide polymer composition includes a reinforcing fiber having a long physical shape (for example, a long carbon fiber or long glass fiber), drawing extrusion molding may be used to prepare the polyamide polymer composition.

Articles

The polymer compositions can be desirably incorporated into many articles, including but not limited to, automotive components and mobile electronic device components. With respect to automotive components, at least in part due to the increased Tg (and therefore increased mechanical performance at elevated temperatures), the polymer compositions described herein can be desirably incorporated into under the hood automotive applications. In some embodiments, the automotive component is selected from the group consisting of connectors, tubings, housing, pans, switches, sockets, caps, rings, flanges, impellers, brackets, valves, covers, structural supports, washers and any combination of one or more thereof.

The term "mobile electronic device" is intended to denote an electronic device that is designed to be conveniently transported and used in various locations. Representative examples of mobile electronic devices may be selected from the group consisting of mobile electronic phones, personal digital assistants, laptop computers, tablet computers, radios, cameras and camera accessories, watches, calculators, music players, global positioning system receivers, portable games, hard drives and other electronic storage devices. Preferred mobile electronic devices include laptop computers, tablet computers, mobile electronic phones and watches.

Components of mobile electronic devices of interest herein include, but are not limited to, fitting parts, snap fit parts, mutually moveable parts, functional elements, operating elements, tracking elements, adjustment elements, carrier elements, frame elements, switches, connectors, cables, housings, and any other structural part other than housings as used in a mobile electronic devices, such as for example speaker parts. Said mobile electronic device components can be notably produced by injection molding, extrusion or other shaping technologies.

A "mobile electronic device housing" refers to one or more of the back cover, front cover, antenna housing, frame and/or backbone of a mobile electronic device. The housing may be a single article or comprise two or more components. A "backbone" refers to a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas.

In a preferred embodiment, the mobile electronic device housing is selected from the group consisting of a mobile phone housing, an antenna housing, a tablet housing, a laptop computer housing, a tablet computer housing or a watch housing.

The article such as the mobile electronic device components can be made from the polymer composition using any suitable melt-processing method. For example, formation of the mobile electronic device component includes injection molding or extrusion molding the polymer composition. Injection molding is a preferred method.

EXAMPLES

The following examples demonstrate the synthesis and thermal performance of the polyamide polymers.

Example 1: Synthesis of PA 5,T/1,3-BAC,T/5,I/1,3-BAC,I

The present example demonstrates the synthesis of PA 5,T/1,3-BAC,T/5,I/1,3-BAC,I (55/35/5/5). For clarity, in the general notation PA R'$_{PA1}$/R'$_{PA2}$/ . . . /R'$_{PAn}$ (X$_1$/X$_2$/ . . . /X$_n$), where R'$_{PA1}$ to R'$_{PAn}$ are recurring units, X$_1$ to X$_n$ denote the relative number of moles of the corresponding recurring units. For example, PA 5,T/1,3-BAC,T/5,I/1,3-BAC,I (55/35/5/5) includes 55 mol % percent recurring unit 5,T; 35 mol % recurring unit 1,3-BAC,T; 5 mol % recurring unit 5,I; and 5 mol % recurring unit 1,3-BAC,I. Analogous notation is used below.

The molar equivalent amounts of pentamethylenediamine, 1,3-bis(aminomethyl)cyclohexane, terephthalic acid and isophthalic acid were charged into the agitated reactor and added with DI water (50 wt %). Phosphorus acid (120 ppm by weight equivalent P) was used as an additive in the polymerization. As used herein ppm refers to ppm by weight, unless explicitly noted otherwise. The mixture was heated to 335° C. The steam generated was released and the reacting mixture was further heated at this temperature for another 60 minutes at ambient pressure. Vacuum was applied for 10 minutes before the heating was turned off. The formed polymer was discharged and analyzed for their thermal properties.

Example 2: Synthesis of PA 5,T/1,4-BAC,T

The present example demonstrates the synthesis of PA 5,T/1,4-BAC,T (50/50). Similar procedure as described in Example 1 was followed using the molar equivalent amounts of pentamethylenediamine, 1,4-bis(aminomethyl)cyclohexane and terephthalic acid.

Example 3: Synthesis of PA 5,T/1,3-BAC,T

The present example demonstrates the synthesis of PA 5,T/1,3-BAC,T (50/50). Similar procedure as described in Example 1 was followed using the molar equivalent amounts of pentamethylenediamine, 1,3-bis(aminomethyl)cyclohexane and terephthalic acid.

Example 4: Thermal Characterization of the Polyamide Polymer

The present example demonstrates the thermal characterization of the polyamide polymers.

To demonstrate thermal characterization, Tg and Tm were measured following ASTM D3418 standard. The results are displayed in Table 1, below. In Table 1, polyamides denoted with a "1" refer to values obtained from Japanese patent application publication number JP2011111576A2 to Katsuhisa et al, filed on Nov. 30, 2009; polyamides denoted with a "2" refer to values obtained from U.S. Pat. No. 9,080,029B2 to Rulkens et al, issued on Jul. 14, 2015; and polyamide denoted with a "3" refer to values obtained from Japanese patent application publication number JP2012102232A2 to Yuki et al., filed on Nov. 10, 2010.

TABLE 1

| Example Number | Polyamide Polymer (Molar Ratio) | Thermal Properties | | |
|---|---|---|---|---|
| | | Tg °C. | Tm °C. | Tm-Tg °C. |
| E1 | PA 5, T/1, 3-BAC, T/5, I/1, 3-BAC, I (55/35/5/5) | 162 | 289 | 127 |
| E2 | PA 5, T/1, 4-BAC, T (50/50) | 164 | 294 | 130 |
| E3 | PA 5, T/1, 3-BAC, T (50/50) | 152 | 307 | 155 |
| CE1 | PA 5, 10 | 40 | 217 | 177 |

TABLE 1-continued

| Example Number | Polyamide Polymer (Molar Ratio) | Thermal Properties | | |
|---|---|---|---|---|
| | | Tg °C. | Tm °C. | Tm-Tg °C. |
| CE2 | PA 5, T$^1$ | 146 | 367 | 221 |
| CE3 | PA 5, T/6, T$^2$ (44/56) | 142 | 312 | 170 |
| CE4 | PA 5, T/5, 10$^1$ (50/50) | 131 | 308 | 177 |
| CE5 | PA 5, T/5, 10$^1$ (60/40) | 134 | 317 | 183 |
| CE6 | PA 5, T/5, 10$^1$ (70/30) | 137 | 326 | 189 |
| CE7 | PA 5, T/5, 6$^1$ (50/50) | 132 | 273 | 141 |
| CE8 | PA 5, T/6, T$^1$ (50/50) | 133 | 312 | 179 |
| CE9 | PA 5, T/10, T$^3$ (55/45) | 130 | 275 | 145 |
| CE10 | PA 5, T/10, T$^3$ (30/70) | 135 | 290 | 155 |

Relative to the other PA 5,T polymers listed, the polyamide polymers described herein have significantly improved. For example, comparison of E1 to E3 with at least CE1 to CE9 demonstrates the introduction of the cycloaliphatic containing recurring unit increases the Tg of the polyamide polymer. Furthermore, Table 1 also demonstrates that Tm−Tg for E1 to E3 was lower than that for CE1 to CE9. While E3 and CE10 had the same Tm−Tg, the Tg and Tm for E3 was significantly higher than that for CE10.

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A polymer comprising recurring units R$_{PA1}$, R$_{PA2}$, R$_{PA3}$, R$_{PA4}$, wherein
    a) recurring unit R$_{PA1}$ is represented by the following formula:

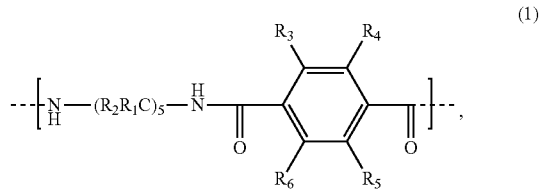

wherein
  R$_1$ and R$_2$, at each location, is independently selected from the group consisting of a hydrogen, a halogen, an alkenyl, an alkynyl, on aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and
  R$_3$ to R$_6$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

b) Recurring unit $R_{PA2}$ is represented by a formula selected from the following group of formulae:

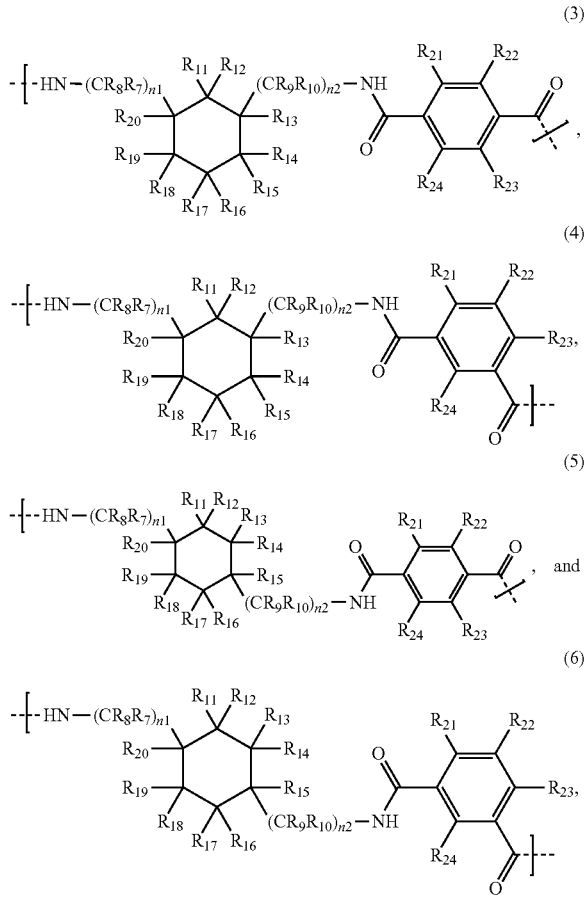

Wherein $R_7$ to $R_{10}$, at each location, and $R_{11}$ to $R_{24}$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $n_1$ and $n_2$ are independently selected integers from 1 to 10;

c) recurring unit $R_{PA3}$ is distinct from recurring unit $R_{PA1}$ and represented by Formula (1) or the following formula:

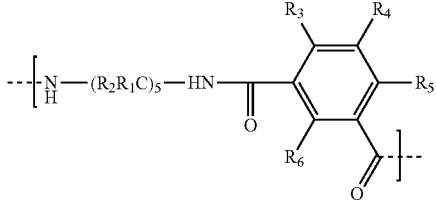

d) recurring unit $R_{PA4}$ is distinct from recurring unit $R_{PA2}$ and is represented by a formula selected from Formulae (3) to (6).

2. The polyamide polymer of claim 1, wherein recurring unit $R_{PA1}$ is represented by Formula (1) and $R_{PA2}$ is represented by Formula (3).

3. The polyamide polymer of claim 1, wherein recurring unit $R_{PA1}$ is represented by Formula (1) and $R_{PA2}$ is represented by Formula (5).

4. The polyamide polymer of claim 1, wherein $R_1$, $R_2$ and $R_7$ to $R_{10}$, at each location, is a hydrogen and $R_3$ to $R_6$ and $R_{11}$ to $R_{24}$ are all hydrogen.

5. The polyamide polymer of claim 1, wherein the polyamide polymer is either PA 5,T/5,I/1,3-BAC,T/1,3-BAC,I or PA 5,T/5,I/1,4-BAC,T/1,4-BAC,I.

6. The polyamide polymer of claim 1, wherein the polyamide polymer comprises, in total, at least 90 mol % of recurring units $R_{PA1}$ to $R_{PA4}$.

7. The polyamide polymer of claim 1, wherein the polyamide polymer comprises a glass transition temperature ("Tg") of at least 150° C.

8. The polyamide polymer of claim 1, wherein the difference between the melting temperature ("Tm") of the polyamide polymer and the Tg of the polyamide polymer (Tm−Tg) is no more than 170° C.

9. A polyamide polymer composition comprising:
the polyamide polymer of claim 1 and
a reinforcing fiber
optionally, an additive selected from the group consisting of ultra-violet ("UV") stabilizers, heat stabilizers, pigments, dyes, flame retardants, impact modifiers, processing aids, nucleating agents, mineral fillers, and any combination of one or more thereof; and
optionally, an additional polymer selected from the group consisting of a distinct polyamide polymer, a polyester polymer, a polyaryl ether sulfone polymer, a polyaryl ether ketone polymer, a polyarylene sulfide polymer, a polyaryl ether polymer, a liquid crystal polymers, and any combination of one or more thereof.

10. An article comprising
the polyamide polymer claim 1
wherein the article is either
a mobile electronic device component or
an automotive component selected from the group consisting of connectors, tubings, housing, pans, switches, sockets, caps, rings, flanges, impellers, brackets, valves, covers, structural supports, washers and any combination of one or more thereof.

11. A method for making the polyamide polymer of claim 1, the method comprising polycondensing (1) a linear aliphatic diamine and a cycloaliphatic diamine with (2) an aromatic dicarboxylic acid, wherein
the linear aliphatic diamine is represented by the following formula:

$$H_2N-(R_2R_1C)_5-NH_2; \qquad (7)$$

the cycloaliphatic diamine is represented by a formula selected from the following group of formulae:

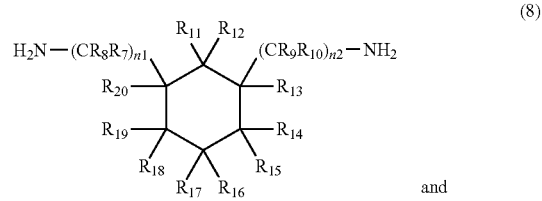

and

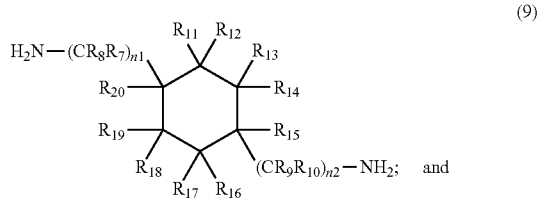
(9)

the aromatic dicarboxylic acid is represented by the following formula:

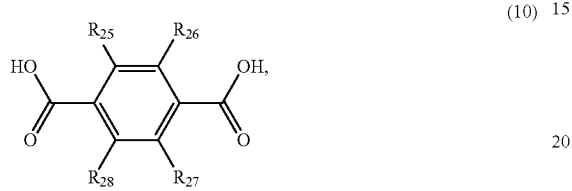
(10)

wherein $R_{25}$ to $R_{28}$ are independently selected from the group consisting of a hydrogen, a hydroxyl, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

* * * * *